United States Patent Office 3,428,893
Patented Feb. 18, 1969

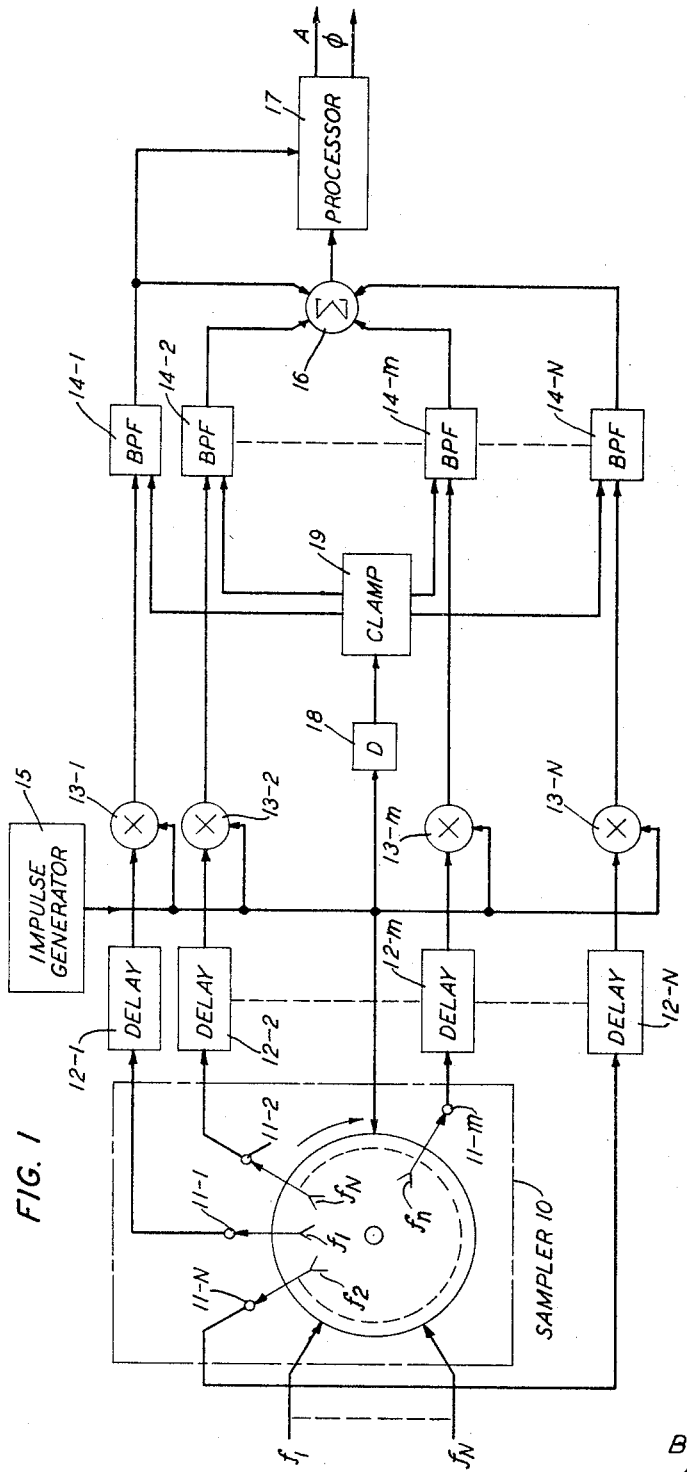

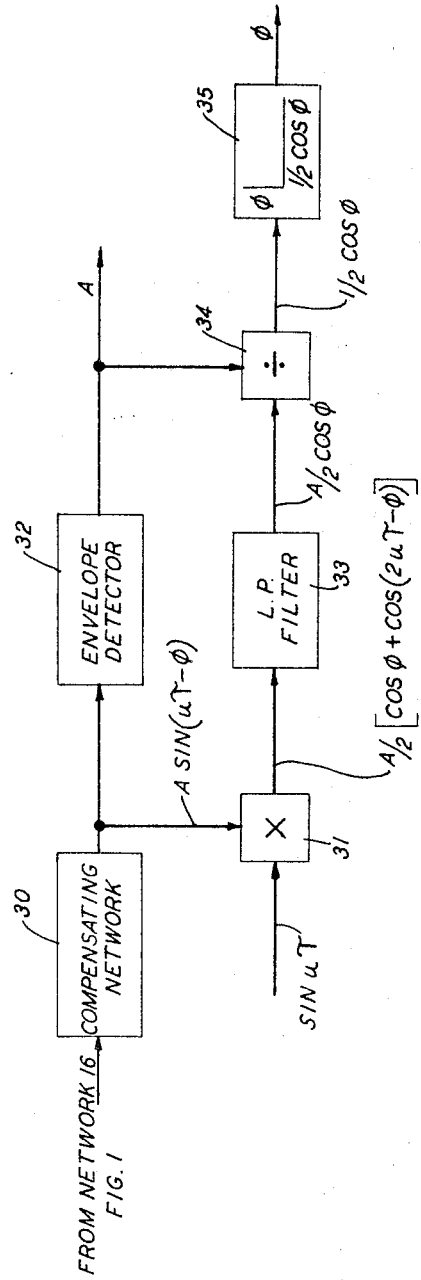

3,428,893
SPECTRUM ANALYZER
Bruce P. Bogert, Morris Township, Morris County, and Peter Hirsch, Parsippany, N.J., assignors to Bell Telephone Laboratories, Incorporated, Murray Hill, N.J., a corporation of New York
Filed Dec. 22, 1966, Ser. No. 603,955
U.S. Cl. 324—77       6 Claims
Int. Cl. G01r 23/18

ABSTRACT OF THE DISCLOSURE

Samples of a waveform segment to be spectrum analyzed are stored and used to drive an equal number of bandpass filters adjusted to resonate at selected frequencies. The instantaneous phases of the output signals from these filters are such that their sum, when processed, yields the amplitude and phase spectrums of the waveform segment.

Multiplexing apparatus permits one spectrum analyzer to analyze sequentially, in real time, many waveform segements.

Background of the invention

Prior art spectrum analyzers have been generally of two types: heterodyne sweep analyzers or bandpass filter analyzers. Heterodyne sweep analyzers are inherently slow devices incapable of providing continuous frequency spectrums in real time. Bandpass filter analyzers, on the other hand, produce amplitude spectrums in real time, but in the process of doing so yield no phase information.

To overcome limitations of the heterodyne and bandpass filter analyzers, a third type of spectrum analyzer has been developed. This analyzer, exemplified by the system disclosed in copending patent application Ser. No. 597,947, filed Nov. 30, 1966, by George H. Robertson, and assigned to Bell Telephone Laboratories, Incorporated, amplitude modulates each of a set of cosinusoids equally spaced in frequency with a corresponding one of an equal number of samples of a waveform segment to be spectrum analyzed. By appropriately choosing the frequencies and initial phases of these cosinusoids, the sum of the modulated cosinusoids possesses sufficient information to yield the amplitude and phase spectrums of the waveform segment being analyzed.

Robertson's system uses, in one embodiment, a large number of oscillators to generate the large number of phase adjusted cosinusoids required. These oscillators are expensive.

Summary of the invention

Accordingly, this invention replaces the oscillators of Robertson's analyzer with carefully tuned bandpass filters which resonate at selected frequencies. By replacing the oscillators with filters, considerable reduction in the complexity of the spectrum analyzer is achieved with no reduction in the accuracy of the resulting spectrums.

In one embodiment of this invention, a series of pulses is generated and each pulse is passed simultaneously to a plurality of modulators. In each modulator, a selected sample from the waveform segment to be analyzed is used to amplitude modulate the corresponding pulse. Each modulated pulse is then used to drive a corresponding bandpass filter possessing a unique and carefully selected resonant frequency. The output signals from all the filters are summed and the resulting sum signal, when appropriately processed, yields amplitude and phase spectrums of the waveform segment.

Stability considerations require that each filter produce a somewhat damped output signal. Thus, compensating apparatus is provided to maintain the amplitude of the sum of the resulting output signals constant with time.

Further, while the amplitude and phase spectrums of a given waveform segment are obtained in a very short time, the filters, though damped, resonate for a much longer time. Accordingly, the filters are clamped at selected times to remove residual oscillatory energy prior to the generation of a new pulse.

This invention may be more fully understood from the following detailed description of embodiments thereof, taken together with the following drawings in which:

Brief description of the drawings

FIG. 1 is a schematic block diagram of one embodiment of this invention; and

FIG. 2 is a schematic block diagram of processor 17, shown in FIG. 1.

Detailed description of the invention

FIG. 1 shows one embodiment of this invention. In this embodiment, a plurality of N input signals $f_1$ through $f_N$, where N is a selected positive integer, derived from sources not shown, are simultaneously sampled in sampler 10 in response to pulses from generator 15. Each signal is represented by N samples which are appropriately delayed in elements 12 so that all the samples of a given signal reach the N modulators 13 simultaneously. Each pulse from generator 15 is also delivered to each of modulators 13, thus, in effect, simultaneously producing N replica pulses. At the modulators 13, each of the N samples representing one selected signal segment modulates a corresponding one of the N replica pulses produced from a single pulse from generator 15. The resulting N sample-modulated pulses drive filters 14 which resonate at selected frequencies. By summing the output signals from these pulse driven filters in network 16, a sum signal is obtained, which yields, when processed in processor 17 with a reference signal from filter 14–1, the amplitude and phase spectrums of the waveform segment being analyzed. Since samples representing different signals emerge at different times from delays 12, the spectrums of segments of all the signals being sampled are obtained sequentially from processor 17.

Sampler 10 is controlled by pulses from generator 15. Input signal $f_1$ is sampled at a given starting time by momentarily closing a switch, symbolically shown by the arrow in contact with lead 11–1. The resulting sample of signal $f_1$ is passed through lead 11–1 to delay 12–1. At the same time, signal $f_2$ is sampled and the sample is pased on lead 11–N to delay 12–N. Similarly, the sample of signal $f_N$ is passed on lead 12–2 to delay 12–2. Thus in general, the first sample of signal $f_n$ is passed over lead 11–$m$ to delay 12–$m$, where $n$ represents all positive integers given by $1 \leq n \leq N$ and $m$ is a positive integer given, at the first sampling instant, by $m = N+2-n$ when $2-n \leq 0$, and by $m = 2-n$ when $2-n > 0$.

At the next sampling instant, the sample of signal $f_1$ is passed on lead 11–2 to delay 12–2. The sample of signal $f_2$ is passed on lead 11–1 to delay 12–1. Thus, in general, the second sample of signal $f_n$ is passed on lead 11–($m+1$) (not shown) to delay 12–($m+1$) (not shown).

It can be shown that in general, the $i$th sample of the $n$th signal is transmitted from sampler 10 on the $m$th output lead where $m$, an integer, equals $(1-n+i-jN)$; $j$, an integer, is given by $$[(1-n+i)/N] - 1 \leq j < (1-n+i)/N$$

and $i$, a positive integer, assumes sequentially the values given by $1 \leq i \leq I$, where I is a selected positive integer.

Thus, at each sampling time, the lead on which the sample of a given signal is transmitted increases in address by one. As a result, the first N samples of signal $f_1$ are transmitted sequentially and on a one-to-one basis over the N leads 11–1 through 11–N to delays 12–1 through 12–N. Appropriate sampling and switching apparatus is well known in the signal processing arts and thus this apparatus will not be described in further detail.

Delays 12 convert the serial stream of samples representing each signal into a parallel set of samples. This is done by making delay 12–$m$ longer, by the sampling interval, than delay 12–$(m+1)$. Thus, the samples representing a given signal appear simultaneously on the output leads of delays 12. Appropriate delays are well known. Such delays may, for example, comprise ultrasonic delay lines.

Pulse generator 15 produces a pulse simultaneously with the appearance of a set of samples on the output leads of delays 12. This pulse is sent simultaneously to modulators 13–1 through 13–N. Each modulator 13 produces an output signal only in response to the simultaneous presence of two input signals. Thus, the simultaneous arrival at modulator 13–1, for example, of the sample from delay 12–1 and the pulse from generator 15 produces an amplitude modulated pulse on the output lead from modulator 13–1. At the same time, the simultaneous presence of a sample on the output lead of delay 12–2, and the pulse from generator 15, produces an amplitude modulated output pulse on the output lead of modulator 13–2. Output pulses are similarly produced on the output leads of all the remaining modulators 13, provided, of course, the amplitude of the sample from the corresponding delay 12 is not zero.

The output pulses from modulators 13 drive single-tuned bandpass filters 14–1 through 14–N. The center frequencies of filters 14 are selected so that each filter has a unique resonant frequency equally spaced, in the frequency domain, from the frequencies of the adjacent filters. The spacing of the center frequencies of the filters is selected to be the quantity $\theta$, defined hereinafter in Equation 1. The Q of each filter is chosen such that the ratio of center frequency to Q is a consant which, as is well known, is the time constant of the filters. The time constant of the filters is represented as $a$ in Equation 1, hereinafter. A final criterion for the selection of the filters is that the impulse response of the $i$th filters must be $$e^{-\tau} \sin (i\theta + u)\tau$$

As is well known, this requires that each filter is a simple series or parallel RLC circuit.

Filters 14 have sinusoidal impulse responses. They could, if desired, have consinusoidal impulse responses. The output signals from these filters are summed in network 16 to produce a sum signal with an envelope proportional to the amplitude spectrum of the input waveform whose samples were used to driver filters 14. This output signal is sent through processor 17 to generate signals representing the amplitude and phase spectrums of the input waveform being analyzed.

As shown in the above-mentioned copending Robertson application, the time necessary to generate the amplitude and phase spectrums of a waveform segment is inversely proportional to the resonant frequency difference between filters. Thus, the higher this frequency difference, the shorter the analysis time. Filters 14, however, even though damped, resonate for an appreciably longer time than necessary to determine the spectrums of a given waveform segment. Thus, after a given time these filters must be clamped so that no residual energy from prior samples interferes with the analysis of the next following waveform segment. Clamp 19 does this.

Clamp 19 is controlled by the pulses from generator 15, delayed in delay 18 by the time necessary to generate a frequency spectrum. This time is less than the period between pulses from generator 15. On emerging from delay 18, each pulse activates clamp 19. Clamp 19 momentarily grounds the output leads from filters 14, thereby removing the residual energy from the prior excitation. Filters 14 are thus substantially quiescent prior to the application of the next following driving signals from modulators 13.

Processor 17 is similar to the processors shown in FIGS. 4, 5, and 6 of the above-mentioned copending Robertson application. One embodiment of processor 17 is shown in more detail in FIG. 2. The output signal from sum network 16 (FIG. 1) as shown by Equation 1, has an envelope which represents the amplitude spectrum A of the waveform segment being analyzed.

$$\sum_{i=0}^{N-1} f(iT)e^{-a\tau} \sin (i\theta + u)\tau = A(\tau)e^{-a\tau} \sin (u - \Phi/\tau)\tau \tag{1}$$

Here $f(iT)$ represents the amplitude of the $i$th sample, T represents the sampling interval, $\sin (i\theta + u)\tau$ represents the output signal from the $i$th bandpass filter, $\theta$ is the frequency difference between the resonant frequencies of adjacent filters, $u$ is a reference carrier frequency, $\tau$ is time, and $\Phi$ represents the phase spectrum of the waveform segment being analyzed. Equation 1, but for the term $e^{-a\tau}$ is identical to Equation 21$b$ of the above-cited Robertson application.

As shown by Equation 1, filters 14 produce output signals attenuated by $e^{-a\tau}$, where $a$ represents the time constants of the filters. All filters are adjusted so that the attenuation with time of an impulsively generated output signal is the same for all filters. Thus, the sum signal from network 16 is passed through compensating network 30 (FIG. 2) where it is amplified by $e^{a\tau}$ to remove the effect of attenuation on its amplitude.

Amplifiers with time-varying gain, suitable for use in network 30, are well known.

A signal representing A is obtained by envelope detecting the output signal from compensator 30 in detector 32 for the case where the resonant frequency $u$ of the reference filter 14–1 is much greater than the instantaneous frequency $\Phi/\tau$.

The phase spectrum $\Phi$ of the waveform segment being analyzed is obtained by modulating, in modulator 31, the output signal from network 16 with the so-called reference sinusoid, $\sin u\tau$, from filter 14–1 (FIG. 1). This modulation product is $[A(\tau)/2][\cos \Phi + \cos (2u\tau - \Phi)]$. The high frequency term $[\cos (2u\tau - \Phi)]$ is removed by low pass filter 33 to leave only the term $[A(\tau)/2] \cos \Phi$. Envelope A is removed in dividing network 34 and the phase $\Phi$ is obtained as a function of time $\tau$ from nonlinear network 35.

The above-described embodiment is, of course, merely illustrative of the application of the principles of this invention. Other arrangements may be devised by those skilled in the signal processing arts without departing from the spirit and scope of the invention.

What is claimed is:

1. Apparatus which comprises
   means for generating N serial trains of samples representing selected segments of N signals,
   means for converting each of said N serial trains of samples to a parallel set of samples,
   means which resonate at N frequencies selectively spaced in the frequency domain,
   means for driving each of said resonating means with a corresponding sample in the $k$th set of said N parallel sets of samples, thereby to produce N amplitude modulated output signals, where $k$, an integer, assumes sequentially the values given by $1 \leq k \leq N$, and
   means for processing said N output signals to produce signals representing the amplitude and phase spectrums of said $k$th parallel set of samples.

2. Apparatus as in claim 1 in which said means which resonate comprise

N bandpass filters selected to resonate at N frequencies equally spaced in the frequency domain.

3. Apparatus which comprises means for sampling up to N signals to derive up to N sets of N samples each, where N is a selected positive integer, N bandpass filters, each adjusted to resonate at a corresponding one of N selected frequencies, means for simultaneously driving each of said filters with a corresponding sample in the $k^{th}$ set of samples to produce N output signals at the resonant frequencies of said filters, where $k$ assumes sequentially all integral values given by the relation $1 \leq k \leq N$, and means for processing said output signals to produce signals representing the frequency spectrum of said $k^{th}$ set of samples.

4. Apparatus as in claim 3 in which said sampling means includes

N input and N output leads, means for generating a train of I timing pulses $1 \ldots i \ldots I$, where I is a selected positive integer, and $i$, an integer, represents the $i^{th}$ timing pulse, and means responsive to each of said timing pulses, for sending the $i^{th}$ sample of the $n^{th}$ input signal from said sampling means on the $m^{th}$ output lead, where $n$ assumes simultaneously all integral values given by $1 \leq n \leq N$, $m$, an integer, equals $(1-n+i-jN)$, and $j$, an integer, is given by $$[(1-n+i)/N]-1 \leq j < (1-n+i)/N$$

5. Apparatus as in claim 4 in which said driving means comprises

N delays, each possessing an input lead connected to a corresponding one of the N output leads from said sampling means, and an output lead, the $m^{th}$ delay being longer, by the sampling interval, than the $(m+1)^{th}$ delay, N modulators, each with a first input lead connected to the output lead of a corresponding one of said N delays, a second input lead connected to said generating means, and an output lead connected to a corresponding one of said N bandpass filters, each modulator producing an output pulse to drive said corresponding filter in response to the simultaneous presence on said first and second input leads of a sample from the $k^{th}$ set of samples and a timing pulse from said generating means, where $k$ assumes sequentially all integral values given by the relation $1 \leq k \leq N$, and means responsive to said timing pulse for removing residual energy from said N bandpass filters.

6. Apparatus as in claim 5 in which said processing means comprises summing and compensating networks for processing the N output signals from said filters to produce a first signal proportional to $A \sin (u\tau - \Phi)$, where A represents the amplitude spectrum of said $k^{th}$ set of samples, $\Phi$ represents the phase spectrum of said $k^{th}$ set of samples, $u$ represents the resonant frequency of a selected one of said N filters, and $\tau$ represents time, means for multiplying said first signal by a reference signal, $\sin u\tau$, from a selected one of said filters to produce a second signal proportional to $$A/2[\cos \Phi + \cos (2u\tau + \Phi)]$$

means for low pass filtering said second signal to produce a third signal proportional to $A/2 \cos \Phi$, means for detecting the envelope of said first signal to produce a first output signal proportional to A, means for dividing said third signal by said first output signal to produce a quotient signal proportional to ½ cos $\Phi$, and means for producing from said quotient signal a second output signal proportional to $\Phi$.

References Cited

UNITED STATES PATENTS

| | | | |
|---|---|---|---|
| 2,705,742 | 4/1955 | Miller | 324—77 |
| 3,009,106 | 11/1961 | Haase | 324—77 |
| 3,026,475 | 3/1962 | Applebaum | 324—77 |
| 3,051,897 | 8/1962 | Peterson et al. | 324—77 |
| 3,115,605 | 12/1963 | Coulter | 324—77 |
| 3,165,586 | 1/1965 | Campanella | 324—77 |
| 3,180,445 | 4/1965 | Schwartz et al. | |
| 3,281,776 | 10/1966 | Ruehle | 324—77 |
| 3,284,763 | 11/1966 | Burg et al. | 324—77 |

RODNEY D. BENNETT, *Primary Examiner.*

D. C. KAUFMAN, *Assistant Examiner.*